United States Patent
Boulanov et al.

(10) Patent No.: US 9,219,637 B2
(45) Date of Patent: Dec. 22, 2015

(54) FACILITATING RAPID ESTABLISHMENT OF HUMAN/MACHINE COMMUNICATION LINKS WITH PRIVATE SIP-BASED IP NETWORKS USING PRE-DISTRIBUTED STATIC NETWORK ADDRESS TRANSLATION MAPS

(76) Inventors: Oleg Boulanov, Beverly, MA (US);
William M. Ward, Andover, MA (US);
John E. Hopwood, Andover, MA (US)

(*) Notice: Subject to any disclaimer, the term of this patent is extended or adjusted under 35 U.S.C. 154(b) by 898 days.

(21) Appl. No.: 12/697,241

(22) Filed: Jan. 30, 2010

(65) Prior Publication Data

US 2011/0188491 A1    Aug. 4, 2011

(51) Int. Cl.
*H04L 29/12*    (2006.01)
*H04L 29/06*    (2006.01)

(52) U.S. Cl.
CPC ........ *H04L 29/12537* (2013.01); *H04L 29/125* (2013.01); *H04L 29/12528* (2013.01); *H04L 61/2564* (2013.01); *H04L 61/2575* (2013.01); *H04L 61/2585* (2013.01); *H04L 65/1006* (2013.01)

(58) Field of Classification Search
CPC ............ H04L 29/125; H04L 29/12528; H04L 29/12537; H04L 61/2564; H04L 61/2575; H04L 61/2585; H04L 65/1006
USPC .......................................... 370/352, 401, 389
See application file for complete search history.

(56) References Cited

U.S. PATENT DOCUMENTS

| 6,577,968 | B2 | 6/2003 | Nelson |
| 7,457,756 | B1 | 11/2008 | Nelson et al. |
| 7,492,814 | B1 | 2/2009 | Nelson |
| 7,522,594 | B2 | 4/2009 | Piche et al. |
| 7,624,195 | B1 | 11/2009 | Biswas et al. |

(Continued)

FOREIGN PATENT DOCUMENTS

| KR | 1020040001141 A | 1/2004 |
| KR | 1020060013152 A | 2/2006 |

OTHER PUBLICATIONS

Kenneth N. Stevens, Acoustic Phonetics, book, 1998, pp. 258-259, Massachusetts Institute of Technology, United States.

(Continued)

*Primary Examiner* — Khaled Kassim
(74) *Attorney, Agent, or Firm* — Russ Weinzimmer & Associates, P.C.

(57) ABSTRACT

A method and system are provided that enhance human/machine communication so as to more closely approximate natural human/human communication by more effectively establishing communications links for human-interactive media. Specifically, the speed and quality of the connection are improved by the method and system, resulting in a more natural user experience. The method includes receiving a Session Initiation Protocol (SIP) call request from an Endpoint (EP). The method determines an external address based on an internal address of the EP uniquely mapped to the external address and pre-distributed to SIP internal routers. The method includes modifying the SIP call request to replace the EP internal address with the EP external address. The method includes forwarding the EP external address to the EP. The method includes establishing a communication link for human-interactive media between the EP and the call provider, the EP using the EP external address, and the communication link not including the SIP Internal Router.

17 Claims, 5 Drawing Sheets

(56) References Cited

U.S. PATENT DOCUMENTS

| | | | |
|---|---|---|---|
| 2002/0141352 A1* | 10/2002 | Fangman et al. | 370/254 |
| 2004/0024879 A1* | 2/2004 | Dingman et al. | 709/227 |
| 2004/0228469 A1 | 11/2004 | Andrews et al. | |
| 2005/0201304 A1* | 9/2005 | Olshansky | 370/282 |
| 2007/0071027 A1 | 3/2007 | Ogawa | |
| 2007/0076729 A1* | 4/2007 | Takeda | 370/401 |
| 2007/0112954 A1 | 5/2007 | Ramani et al. | |
| 2009/0031042 A1* | 1/2009 | Phatak | 709/245 |
| 2009/0086728 A1* | 4/2009 | Gulati et al. | 370/389 |
| 2009/0298521 A1* | 12/2009 | Finlayson | 455/500 |
| 2010/0020942 A1* | 1/2010 | Olshansky et al. | 379/45 |

OTHER PUBLICATIONS

Francois Auger and Patrick Flandrin, Improving the Readability of Time-Frequency and Time-Scale Representations by the Reassignment Method, publication, 1995, pp. 1068-1089, vol. 43, IEEE.

T. J. Gardner and M. O. Magnasco, Instantaneous Frequency Decomposition: An Application to Spectrally Sparse Sounds with Fast Frequency Modulations, publication, 2005, pp. 2896-2903, vol. 117; No. 5, Acoustical Society of America, United States.

Randy S. Roberts, William A.. Brown, and Herscel H. Loomis, Jr., Computationally Efficient Algorithms for Cyclic Spectral Analysis, magazine, 1991, pp. 38-49, IEEE, United States.

David T. Blackstock, Fundamentals of Physical Acoustics, book, 2000, pp. 42-44, John Wiley & Sons, Inc., United States and Canada.

Iwao Sekita, Takio Kurita, and Nobuyuki Otsu, Complex Autoregressive Model and Its Properties, publication, 1991, pp. 1-6, Electrotechnical Laboratory, Japan.

Saeed V. Vaseghi, Advanced Digital Signal Processing and Noise Reduction, book, 2006, pp. 213-214, 3rd edition, John Wiley & Sons, Ltd, England.

Malcolm Slaney, An Efficient Implementation of the Patterson-Holdsworth Auditory Filter Bank, technical report, 1993, pp. 2-41, Apple Computer Technical Report #35, Apple Computer, Inc., United States.

* cited by examiner

1

FACILITATING RAPID ESTABLISHMENT OF HUMAN/MACHINE COMMUNICATION LINKS WITH PRIVATE SIP-BASED IP NETWORKS USING PRE-DISTRIBUTED STATIC NETWORK ADDRESS TRANSLATION MAPS

FIELD

The present invention relates generally to network telephony, and more particularly to systems for establishing and maintaining human/machine communications links.

BACKGROUND

Modern communication systems facilitate human-to-human communication at a distance. Compared with other information-bearing signals, direct human/human interaction, such as face-to-face speech, is relatively lag-free, noise-free, even, and stable. Accordingly, typical communications systems that support human/human speech are configured to minimize, or at least reduce, signal distortions such as lag, noise, unevenness, and instability.

One popular approach to communication-at-a-distance is network telephony. Generally, network telephony systems exchange digital signals that represent speech. In some network telephony systems, the digital signals are the result of processing captured analog speech signals. In other network telephony systems, one or more of the digital signals are created by a machine as an original signal.

Network telephony has grown in popularity, in part because of the advent of a standard protocol, the "Session Initiation Protocol (SIP)." Generally, some SIP systems follow certain protocols to establish and maintain communications links for human-interactive media. In some cases, the human-interactive media is provided by software systems that create synthesized speech for delivery to the human user. In other cases, the human-interactive media is speech generated by another human, digitized and transmitted on the network. Thus, SIP systems support both human/human and human/machine communication.

These systems, however, suffer from numerous drawbacks. For example, humans are generally adept at filtering out signal distortion in ordinary face-to-face human/human communication, in part because visual information such as body language provides additional context. Humans are also much more skilled than machines in extracting meaning from distorted signals in human/human communication at-a-distance.

In human/machine communications, however, signal distortions can cause significant problems in both signal processing and content extraction. For example, instable connections, suffering from high drop-out, can greatly degrade human/machine communication. The initial setup period is particularly vulnerable to signal distortions, requiring efficient connection setup of a link between the human interface device and the machine hosting the target application for human/machine communication.

In typical prior art systems, Network Address Translation (NAT) is used to protect a private network from unwanted communications. Generally, NAT systems employ a list of private addresses for Endpoints within a private network. Typical NAT systems remap the private addresses to external Internet Protocol (IP) addresses, which are then used to contact devices outside of the private network. The NAT device keeps a list of the translated addresses and creates a secure connection to external devices, which do not know the internal addresses. The external devices communicate via the external IP addresses, through the NAT device, which forwards messages to the appropriate internal addresses. NAT systems sometimes also include port address translation (Network Address Port Translation, or NAPT), allowing for multiple devices to share the same external IP address, mapped to different ports.

But typical NAT systems cannot achieve the call setup efficiencies necessary to support the lag-free, noise-free, even, and consistent sound that meaningful, intensive human/machine interactions require. This drawback is even more pronounced in environments using Advanced Interactive Media Applications, which require high performance processors with full interactive application drivers including application logic, application states, and speech recognition resources. Without sufficient operational NAT performance, the call setup process for a human/machine communications link can be so untimely as to cause unsatisfactory connection times and/or increased signal distortion, leading to impaired communications.

SUMMARY

In a general aspect of the invention, a method is provided for establishing a communications link for human-interactive media. The method includes receiving a Session Initiation Protocol (SIP) call request from an Endpoint (EP), performed by an SIP Internal Router. The method includes determining an external address based on an internal address of the EP, performed by the SIP Internal Router, with each EP being one of a plurality of EPs, and each EP having a pre-configured internal address uniquely mapped to an external address. The method includes modifying the contents of the SIP call request to replace the EP internal address with the EP external address, performed by the SIP Internal Router and sending the modified SIP call request to a call provider identified in the SIP call request. The method includes, in the event the call provider accepts the SIP call request, forwarding the EP external address to the EP, performed by the SIP Internal Router. The method includes establishing a communication link for human-interactive media between the EP and the call provider, with the EP using the EP external address, and the communication link not including the SIP Internal Router.

In a preferred embodiment, the SIP Internal Router includes a pre-configured map indicating a unique association of an internal address with an external address for each EP of the plurality of EPs.

In another embodiment, a Network Address Translation (NAT) router couples to the SIP Internal Router, the NAT router including a pre-configured map indicating an unique association of an internal address with an external address for each EP of the plurality of EPs. The method includes translating source information of the modified call request from the SIP Internal Router to replace the EP internal address with the external address, performed by the NAT router. The method includes forwarding the modified and translated call request to the call provider, performed by the NAT router. The method includes facilitating the communication link between the EP and the call provider, performed by the NAT router.

In still another embodiment, the method includes the SIP Internal Router being one of a plurality of SIP Internal Routers, each SIP Internal Router including a pre-configured map indicating a unique association of an internal address with an external address for each EP of the plurality of EPs. In another embodiment, a plurality of Network Address Translation (NAT) routers couple to the SIP Internal Router, each NAT router including a pre-configured map indicating a unique association of an internal address with an external address for each EP of the plurality of EPs.

In yet another embodiment, a plurality of Network Address Translation (NAT) routers couple to the SIP Internal Router, each NAT router including a pre-configured map indicating a unique association of an internal address with an external address for each EP of the plurality of EPs. The SIP Internal Router is one of a plurality of SIP Internal Routers, each SIP Internal Router including a pre-configured map indicating a unique association of an internal address with an external address for each EP of the plurality of EPs.

In still another embodiment, a plurality of Network Address Translation (NAT) routers couple to the SIP Internal Router, each NAT router including a pre-configured map indicating a unique association of an internal address with an external address for each EP of the plurality of EPs. The SIP Internal Router is one of a plurality of SIP Internal Routers, each SIP Internal Router including the pre-configured map, each SIP Internal Router being dedicated to the subset of EPs whose addresses are indicated on the map.

In another general aspect of the invention, method is provided for establishing a communications link for human-interactive media. The method includes receiving a Session Initiation Protocol (SIP) call request from a call provider, performed by an SIP Internal Router. The method includes selecting an Endpoint (EP) of a plurality of EPs based on the SIP call request. The method includes determining an internal address of the EP, performed by the SIP Internal Router, each EP being one of a plurality of EPs, each EP having a pre-configured internal address uniquely mapped to an external address. The method includes determining whether the selected EP is available to accept the SIP call request, performed by the SIP Internal Router. The method includes, in the event the selected EP is available to accept the SIP call request, forwarding the EP external address to the EP, being performed by the SIP Internal Router. The method includes sending a communication packet for human-interactive media to the call provider, the EP using the EP external address, the communication link not including the SIP Internal Router.

In a preferred embodiment, the SIP Internal Router includes a pre-configured map indicating the association of an internal address with an external address for each EP of the plurality of EPs.

In another embodiment, a Network Address Translation (NAT) router couples to the SIP Internal Router, the NAT router including a pre-configured map indicating an unique association of an internal address with an external address for each EP of the plurality of EPs. The method includes translating source information of the modified call request from the SIP Internal Router to replace the EP internal address with the external address, performed by the NAT router. The method includes forwarding the modified and translated call request to the call provider, performed by the NAT router. The method includes facilitating the communication link between the EP and the call provider, performed by the NAT router.

In still another embodiment, the SIP Internal Router is one of a plurality of SIP Internal Routers, each SIP Internal Router including a pre-configured map indicating the association of an internal address with an external address for each EP of the plurality of EPs. In another embodiment, a plurality of Network Address Translation (NAT) routers couple to the SIP Internal Router, each NAT router including a pre-configured map indicating the association of an internal address with an external address for each EP of the plurality of EPs.

In yet another embodiment, a plurality of Network Address Translation (NAT) routers couple to the SIP Internal Router, each NAT router including a pre-configured map indicating the association of an internal address with an external address for each EP of the plurality of EPs. The SIP Internal Router is one of a plurality of SIP Internal Routers, each SIP Internal Router including a pre-configured map indicating the association of an internal address with an external address for each EP of the plurality of EPs.

In still another embodiment, a plurality of Network Address Translation (NAT) routers couple to the SIP Internal Router, each NAT router including a pre-configured map indicating the association of an internal address with an external address for each EP of the plurality of EPs. The SIP Internal Router is one of a plurality of SIP Internal Routers, each SIP Internal Router including the pre-configured map, each SIP Internal Router being dedicated to the subset of EPs having addresses that are included in the map.

In another general aspect of the invention, an apparatus is provided for establishing a communications link for human-interactive media. The apparatus includes a plurality of Endpoints (EPs), each EP having a pre-configured unique internal address and a unique external address, each EP being configured to send a call request, each call request indicating a target and including the internal address of the sending EP. The apparatus includes an SIP Internal Router coupled to the plurality of EPs, the SIP Internal Router including a pre-configured map indicating internal and external addresses of each EP. The SIP Internal Router is configured to modify each call request to replace the internal address of the EP with the external address of the EP sending the call request. The apparatus includes a Network Address Translation (NAT) router coupled to the SIP Internal Router and to the plurality of EPs, the NAT router being configured to send each modified call request to the target indicated in the call request. The NAT router is further configured to receive a response from the target, the response indicating whether the target accepts the call request, and the NAT router is further configured to send the response to the SIP Internal Router. The SIP Internal Router is further configured to send the response and the external address to the EP sending the call request corresponding to that response. The EP is further configured to send a communication packet for human-interactive media to the target, the communication packet including the external address, and the SIP Internal Router not receiving the communication packet.

In a preferred embodiment, the SIP Internal Router includes a pre-configured map indicating the association of an internal address with an external address for each EP of the plurality of EPs. In one embodiment, the NAT router includes a pre-configured map indicating the association of an internal address with an external address for each EP of the plurality of EPs.

In another embodiment, the SIP Internal Router is one of a plurality of SIP Internal Routers, each SIP Internal Router including a pre-configured map indicating the association of an internal address with an external address for each EP of the plurality of EPs. In another embodiment, a plurality of Network Address Translation (NAT) routers couple to the SIP Internal Router, each NAT router including a pre-configured map indicating the association of an internal address with an external address for each EP of the plurality of EPs.

In still another embodiment, a plurality of Network Address Translation (NAT) routers couple to the SIP Internal Router, each NAT router including a pre-configured map indicating the association of an internal address with an external address for each EP of the plurality of EPs. The SIP Internal Router is one of a plurality of SIP Internal Routers, each SIP Internal Router including the pre-configured map.

BRIEF DESCRIPTION OF THE DRAWING

The invention will be more fully understood from the following detailed description, in conjunction with the following figures, wherein.

DETAILED DESCRIPTION

Figure 1:
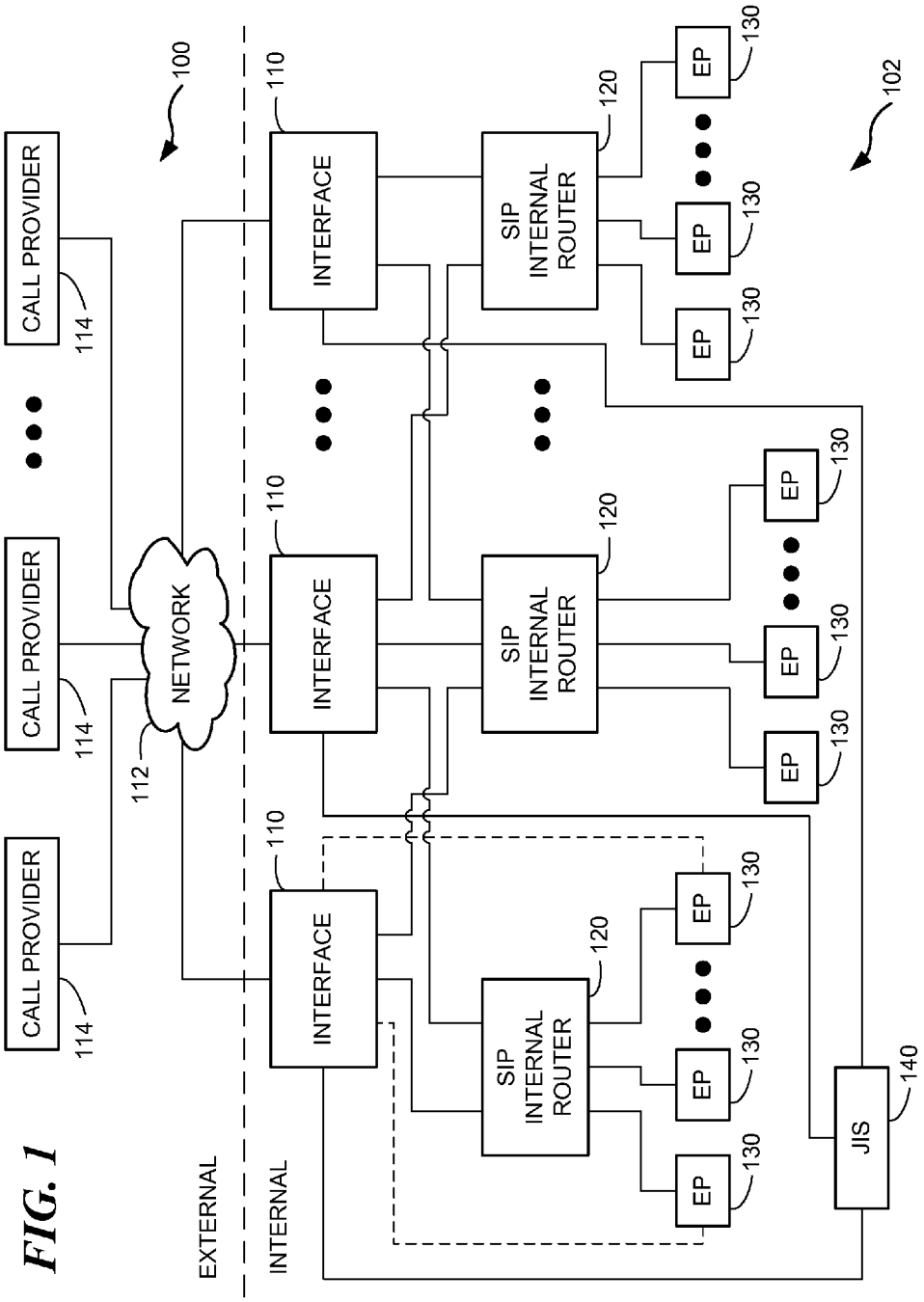
FIG. 1 is a block diagram showing an embodiment of the invention for communicating human-interactive media via the Internet to and from a plurality of call providers.

FIG. 1 is a high-level block diagram illustrating an embodiment of the invention connected to a network 112 so as to provide communication between the invention and a plurality of call providers 114. External network 100 includes network 112 and a plurality of call providers coupled to network 112. Network 112 can be the Internet, a wide-area network, a public switched telephone network, or any other suitable network configured to support internet protocol (IP) based switching. Call providers 114 are each otherwise conventional call providers, configured to provide voice-over-IP (VoIP) services to an end user (not shown).

System 102 includes a plurality of network interfaces 110, each coupled to network 112. Generally, each network interface 110 is an otherwise conventional network interface, configured to route IP packets between network 112 and various components of system 102, as described in more detail below. Specifically, each interface 110 couples to one or more SIP Internal Routers 120, one or more EndPoints (EP) 130, and at least one Job Initiation Service (WS) 140. Additionally, as described in more detail below with reference to FIG. 2, in one embodiment, each interface 110 maintains a complete one-to-one static assignment of internal addresses (IP addresses with or without port assignments) to external addresses (with or without port assignments) for a group of EPs 130.

Generally, each SIP Internal Router 120 establishes end-to-end communication links between a call provider 114 and a particular EP 130, as described in more detail below. In the illustrated embodiment, each SIP Internal Router 120 operates independently. In one embodiment, each SIP Internal Router 120 is configured to be added to or removed from system 102 without causing performance disruptions that significantly affect the system. As described in more detail below with reference to FIG. 2, in one embodiment, each SIP Internal Router 120 maintains a complete one-to-one static assignment mapping of internal addresses (IP addresses with or without port assignments) to external addresses (with or without port assignments) for a group of EPs 130.

Generally, each EP 130 is an otherwise conventional, SIP-enabled, computer-based, or server-based, host, and is configured to provide application service resources. In one embodiment, an application service resource is any suitable resource configured to deliver or support human-interactive media. In one embodiment, each EP 130 is state-full and dedicated/attached for interaction with a human. In the illustrated embodiment, each EP 130 operates independently, and individual EPs 130 can be added, removed, or otherwise altered without substantial performance degradation of the operation of the other system components.

In the illustrated embodiment, each SIP Internal Router 120 couples to a particular subset of all of the EPs 130 in system 102. In one embodiment, each SIP Internal Router 120 couples to every EP 130 in system 102. In one embodiment, each SIP Internal Router 120 couples to a predetermined subset of all of the EPs 130 in system 102. In one embodiment, each SIP Internal Router 120 couples to a dynamically assigned subset of all of the EPs 130 in system 102. In one embodiment, each SIP Internal Router 120 couples to an exclusive subset of all of the EPs 130 in system 102. In an alternate embodiment, each SIP Internal Router 120 couples to a subset of all of the EPs 130 in system 102, and that subset includes one or more EPs 130 also coupled to another SIP Internal Router 120.

In each case, however, each SIP Internal Router 120 maintains a complete one-to-one address map for all of the EPs 130 directly connected to that SIP Internal Router 120. The complete one-to-one address map is a pre-distributed static network address map. In one embodiment a pre-distributed static network address map is a copy of a NAT table held by interface 110, as described in more detail below. Generally, a pre-distributed static network address map is propagated to SIP Internal Router 120 before SIP Internal Router 120 requires access to the information contained therein, such as, for example, in response to an SIP call request. As used herein, an SIP Internal Router 120 is directly connected to an EP 130 when the SIP Internal Router 120 can transmit an addressed packet to that EP 130 without sending the addressed packet to another router.

Similarly, in the illustrated embodiment, each interface 110 couples to a particular subset of SIP Internal Routers 120 of all the SIP Internal Routers 120 in system 102. In one embodiment, each interface 110 couples to every SIP Internal Router 120 in system 102. In one embodiment, each interface 110 couples to a predetermined subset of all of the SIP Internal Routers 120 in system 102. In one embodiment, each interface 110 couples to a dynamically assigned subset of all of the SIP Internal Routers 120 in system 102. In one embodiment, each interface 110 couples to an exclusive subset of all of the SIP Internal Routers 120 in system 102. In an alternate embodiment, each interface 110 couples to a subset of all of the SIP Internal Routers 120 in system 102, and that subset includes one or more SIP Internal Routers 120 also coupled to another interface 110.

In each case, however, each interface 110 maintains a complete one-to-one address map for all of the EPs 130 directly connected to each SIP Internal Router 120 that is itself directly connected to that interface 110. As used herein, an SIP Internal Router 120 is directly connected to an interface 110 when the SIP Internal Router 120 can transmit an addressed packet to that interface 110 without sending the addressed packet to another router.

Very generally, system 102 receives a call request, requesting establishment of a communications link between system 102 and a target call provider 114. The request includes certain link characteristics, such as support for a particular application service resource, and includes an external address for a specific EP 130. Interface 110 translates the external address in the call request IP header to obtain the internal address of the target EP 130. Interface 110 routes the call request to the SIP Internal Router 120 servicing the target EP 130.

The SIP Internal Router 120 translates the external address in the call request SIP header to obtain the internal address of the target EP 130, and if the target EP 130 accepts the request, establishes a communications link between the selected EP 130 and the target call provider 114, using the external address. Having established the communications link, EP 130 and call provider 114 communicate "directly", that is, without including SIP Internal Router 120 in the communication path.

Generally, an in-bound request (provider-to-endpoint) is initiated by a call provider 114 sending a request to a SIP Internal Router 120 (through network 112 and interface 110). Similarly, an out-bound request (endpoint-to-provider) is initiated by Job Initiation Service (JIS) 140 sending a request to a SIP Internal Router 120 (through interface 110, or directly). In one embodiment, an out-bound request includes a 'refer-to' address designating a target call provider 114 and uses the internal address of the EP 130 on whose behalf JIS 140 is requesting the call setup. Generally, the components of system 102 operate as described in more detail with respect to FIGS. 2-5, below.

Figure 2:
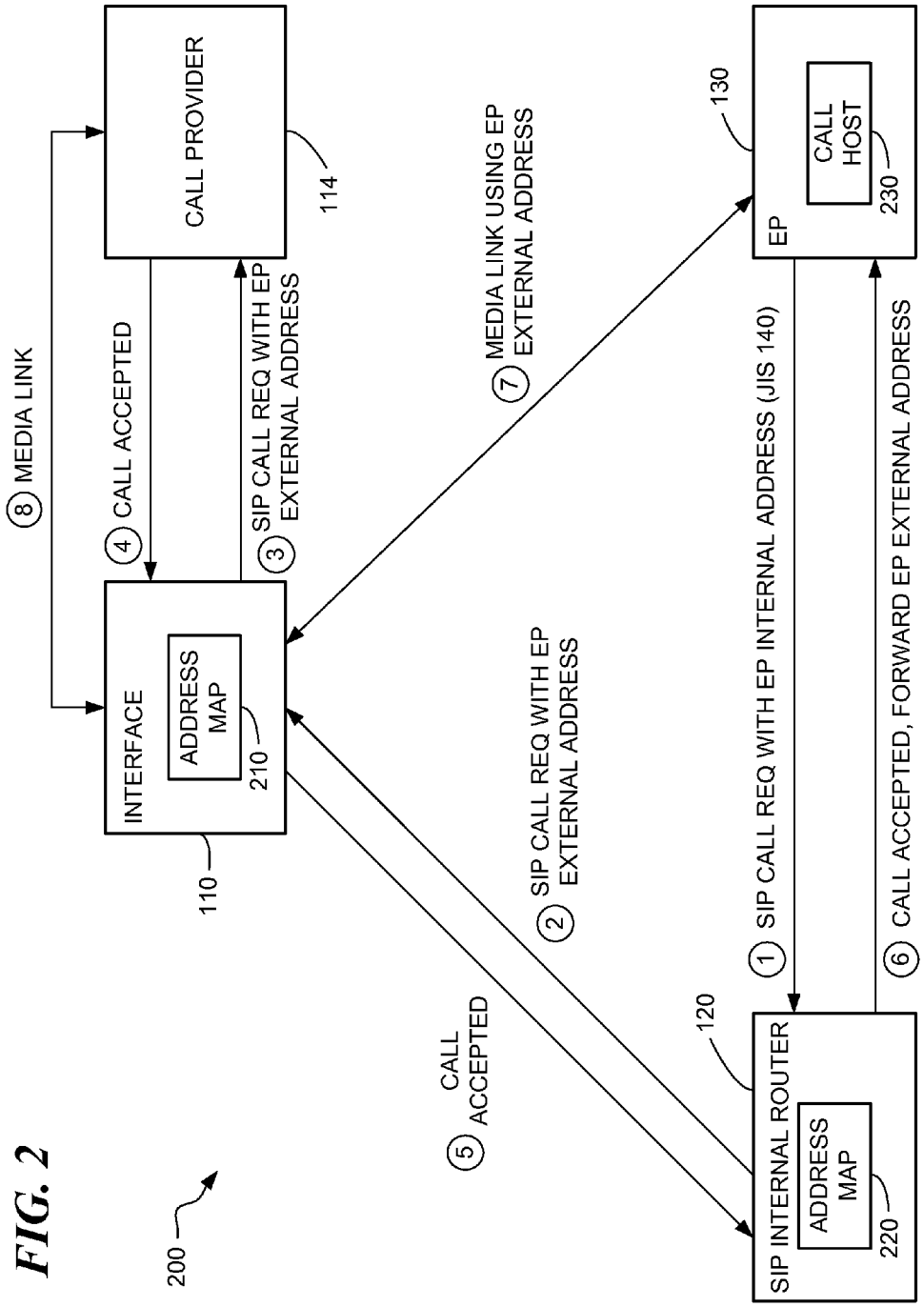
FIG. 2 is a protocol diagram showing a protocol for establishing an outbound communications link for human-interactive media.

FIG. 2 is a protocol diagram illustrating a protocol 200 for establishing an outbound communications link for human-interactive media in accordance with one embodiment. Specifically, FIG. 2 illustrates the interaction of interface 110, call provider 114, SIP Internal Router 120, EP 130, and JIS 140 as a communications link is established between EP 130 and call provider 114.

As indicated at (1), EP 130 initiates an SIP call request, sending a call request to SIP Internal Router 120. In one embodiment, JIS 140 initiates an SIP call request on the behalf of EP 130. In both cases, the call request identifies a target call provider 114 and identifies EP 130 using an internal address for that EP 130. In one embodiment, the call request includes an SIP header.

In the illustrated embodiment, EP 130 includes a call host 230. Generally, call host 230 is an otherwise conventional call host, configured to support lines of service for human-interactive media. Generally, call host 230 is configured to control operation of otherwise conventional human-interactive media servers that are collectively configured to provide application service resources.

SIP Internal Router 120 receives the SIP call request and translates the EP 130 internal address in the SIP header to the EP 130 external address. In one embodiment, each EP 130 in system 102 is identified by a unique internal IP address, which is uniquely mapped to an external IP address. In one embodiment, each EP 130 in system 102 is identified by a unique combination of internal IP address and port, and the combination is uniquely mapped to an external IP address. In one embodiment, each EP 130 in system 102 is identified by a unique combination of internal IP address and port, and the combination is uniquely mapped to a unique combination of external IP address and port. In one embodiment, every internal IP address/port maps in a one-to-one association with a statically assigned external IP address/port.

In the illustrated embodiment, SIP Internal Router 120 maintains a compilation of the one-to-one address mapping in an address map 220. In one embodiment, address map 220 is a lookup table. Generally, address map 220 can be configured with any suitable data structure. In one embodiment, address map 220 includes the one-to-one address mapping of every EP 130 in system 102. In an alternate embodiment, address map 220 includes the one-to-one address mapping of every EP 130 directly connected to SIP Internal Router 120.

SIP Internal Router 120 modifies the call request SIP header to replace the EP 130 internal address with the corresponding external IP address. As indicated at (2), interface 110 passes the call request to a SIP Internal Router 120.

Interface 110 receives the SIP call request from SIP Internal Router 120 and prepares the SIP call request for transmission over the Internet to the target call provider 114. In one embodiment, interface 110 encapsulates the SIP call request with an IP header. In one embodiment, interface 110 translates the EP 130 internal address in the IP header to the EP 130 external address. In an alternate embodiment, interface 110 generates the IP header using the EP 130 external address.

In the illustrated embodiment, interface 110 maintains a compilation of the one-to-one address mapping in an address map 210. In one embodiment, address map 210 is a lookup table. Generally, address map 210 can be configured with any suitable data structure. In one embodiment, address map 210 includes the one-to-one address mapping of every EP 130 in system 102. In an alternate embodiment, address map 220 includes the one-to-one address mapping of every EP 130 directly connected to each SIP Internal Router 120 that is itself directly connected to interface 110.

As indicated at (3), interface 110 forwards the SIP call request to the target call provider 114. In the event the target call provider 114 accepts the call, call provider 114 transmits a response accepting the call request, as indicated at (4). Next, as indicated at (5), interface 110 notifies SIP Internal Router 120 that the target call provider 114 accepts the SIP call request.

Next, as indicated at (6), SIP internal Router 120 notifies EP 130 that the SIP call request has been accepted. Additionally, SIP Internal Router 120 notifies EP 130 of the external address corresponding to that EP 130 internal address. In one embodiment, SIP Internal Router 120 notifies EP 130 of the external address through an SIP header in the message notifying EP 130 of call acceptance. SIP Internal Router 120 also establishes a media communications link on behalf of EP 130.

As indicated at (7), EP 130 communicates along a communications link with interface 110, using the EP 130 external address. As indicated at (8), interface 110 communicates along a communications link with call provider 114, also using the EP 130 external address.

As indicated at (7), EP 130 communicates with call provider 114 through interface 110, and not through SIP Internal Router 120. That is, in one embodiment, SIP Internal Router 120 is only responsible for establishing the communications link, and drops out of the communication messaging path once the call request is accepted and the communications link is established. In one embodiment, SIP Internal Router 120 establishes a direct end-to-end connection between call provider 114 and the selected EP 130. As such, in one embodiment, SIP Internal Router 120 is not required to maintain a call state or proxy media streams to support the communications link.

Thus, protocol 200 provides a system configured to establish NAT-capable SIP communications links based on a complete one-to-one mapping embodied in an address map by SIP Internal Router 120 and interface 110. As described above, systems embodying protocol 200 can be configured to respond quickly and efficiently to call requests, by dividing the address translation task between interface 110 and SIP Internal Router 120, in a completely-mapped address space.

Figure 3:
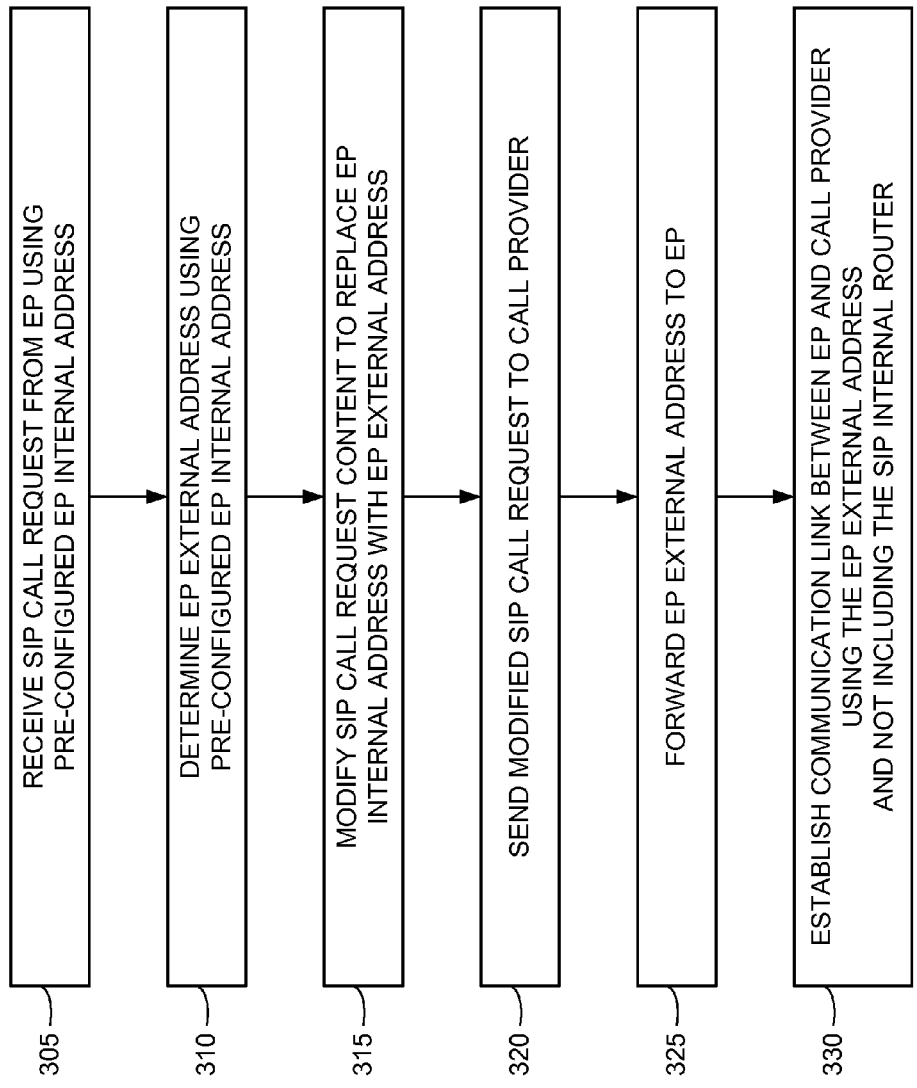
FIG. 3 is a high-level flow diagram depicting logical operational steps of a method for establishing an outbound communications link for communicating human-interactive media.

FIG. 3 is a flow diagram depicting logical operational steps of a method for establishing a communications link for communicating human-interactive media. As indicated at block 305, the process begins and SIP Internal Router 120 receives an SIP call request from an EP 130 (or JIS on behalf of an EP 130) that uses the pre-configured EP 130 internal address.

Next, as indicated at block 310, SIP Internal Router 120 determines the EP 130 external address using the EP 310 internal address. As described above, in one embodiment, SIP Internal Router 120 determines the EP 310 external address though information contained in an address map 220. Next, as indicated at block 315, SIP Internal Router 120 modifies the SIP call request to replace the EP internal address with the EP external address.

Next, as indicated at block 320, interface 110 sends the modified SIP call request to the target call provider 114. As described above, in one embodiment, interface 110 uses an IP header including the EP 130 external address to send the modified SIP call request to the target call provider 114.

Next, as indicated at decisional block 325, SIP Internal Router 120 forwards the EP 130 external address to EP 130. As described above, in one embodiment, SIP Internal Router 120 forwards the EP 130 external address through an SIP header notifying EP 130 that the SIP call request has been accepted.

Next, as indicated at block 330, SIP Internal Router 120 establishes a communications link between the selected EP 130 and call provider 114, and the process ends. As described above, the established communications link does not include SIP Internal Router 120. EP 130 communicates with call provider 114 using the EP external address.

Figure 4:
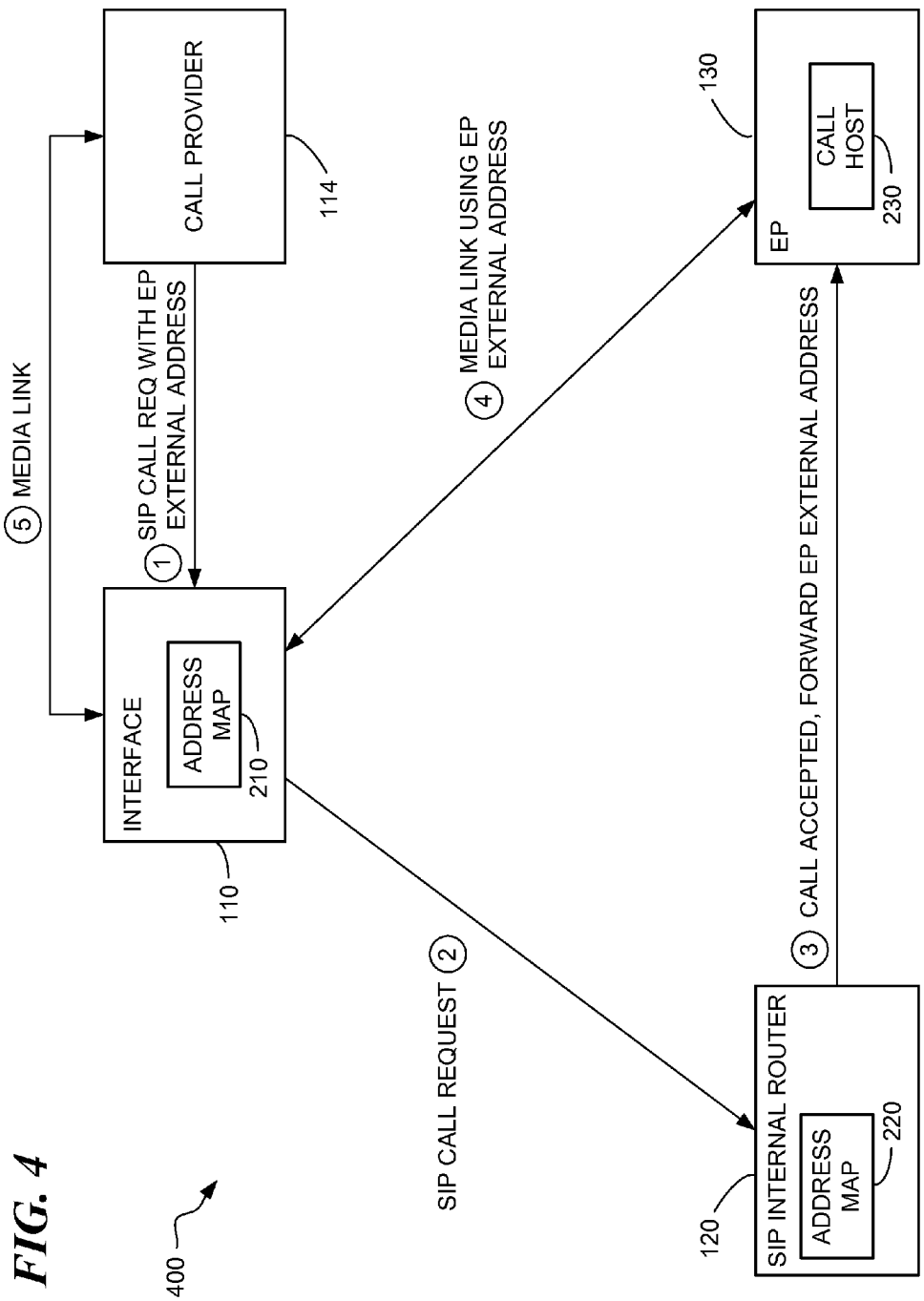
FIG. 4 is a protocol diagram showing a protocol for establishing an inbound communications link for human-interactive media.

FIG. 4 is a protocol diagram illustrating a protocol 400 for establishing an inbound communications link for human-interactive media in accordance with one embodiment. Specifically, FIG. 3 illustrates the interaction of interface 110, call provider 114, SIP Internal Router 120, and EP 130 as a communications link is established between EP 130 and call provider 114.

As indicated at (1), interface 110 receives a SIP call request, identifying a target EP 130 by the EP 130 external address. In one embodiment, interface 110 translates the EP 130 external address to the associated EP 130 internal address. As indicated at (2), interface 110 forwards the SIP call request to an SIP Internal Router 120 directly coupled to the target EP 130.

SIP Internal Router 120 receives the SIP call request and translates the EP 130 external address in the SIP header (of the SIP call request) to the EP 130 internal address. SIP Internal Router 120 forwards the call request to the EP 130 for acceptance or rejection by the target EP 130.

As indicated at (3), if the target EP 130 accepts the call request, SIP Internal Router 120 forwards the EP 130 external address to the target EP 130. SIP Internal Router 120 also establishes a media communications link on behalf of EP 130.

As indicated at (4), EP 130 communicates along a communications link with interface 110, using the EP 130 external address. As indicated at (5), interface 110 communicates along a communications link with call provider 114, also using the EP 130 external address.

As indicated at (4), EP 130 communicates with call provider 114 through interface 110, and not through SIP Internal Router 120. That is, in one embodiment, SIP Internal Router 120 is only responsible for establishing the communications link, and drops out of the communication messaging path once the call request is accepted and the communications link is established. In one embodiment, SIP Internal Router 120 establishes a direct end-to-end connection between call provider 114 and the selected EP 130. As such, in one embodiment, SIP Internal Router 120 is not required to maintain a call state or proxy media streams to support the communications link.

Thus, protocol 400 provides a system configured to establish NAT-capable SIP communications links based on a complete one-to-one mapping embodied in an address map by SIP Internal Router 120 and interface 110. As described above, systems embodying protocol 400 can be configured to respond quickly and efficiently to call requests, by dividing the address translation task between interface 110 and SIP Internal Router 120, in a completely-mapped address space.

Figure 5:
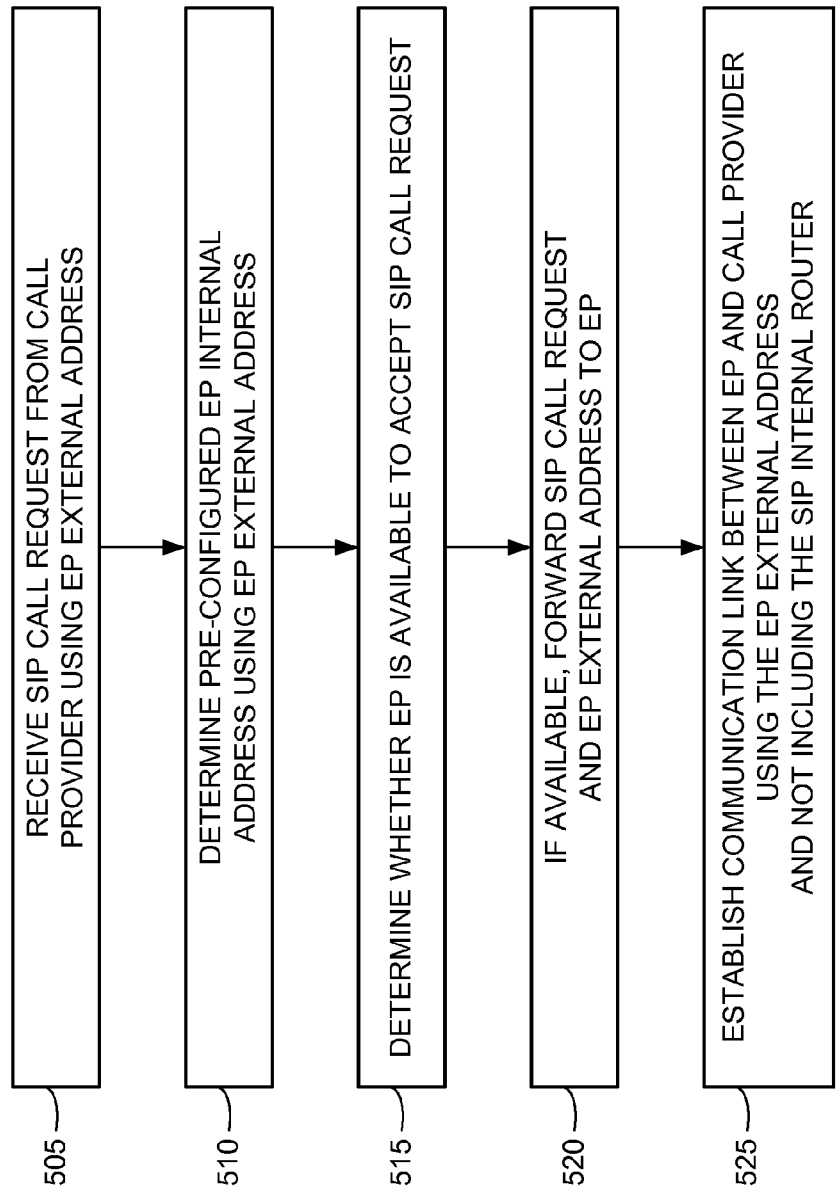
FIG. 5 is a high-level flow diagram depicting logical operational steps of a method for establishing an inbound communications link for communicating human-interactive media.

FIG. 5 is a flow diagram depicting logical operational steps of a method for establishing a communications link for communicating human-interactive media. As indicated at block 505, the process begins and SIP Internal Router 120 receives an SIP call request from a call provider, identifying a target EP 130 by the EP 130 external address.

Next, as indicated at block 510, SIP Internal Router 120 determines the EP 130 internal address using the EP 310 external address. As described above, in one embodiment, SIP Internal Router 120 determines the EP 310 internal address though information contained in an address map 220. Next, as indicated at block 515, SIP Internal Router 120 determines whether the target EP 130 is available to accept the SIP call request.

Next, as indicated at block 520, if the target EP 130 is available, SIP Internal Router 120 forwards the SIP call request and the EP external address to the target EP 130. In one embodiment, SIP Internal Router 120 forwards the EP 130 external address through an SIP header.

Next, as indicated at block 525, SIP Internal Router 120 establishes a communications link between the selected EP 130 and call provider 114, and the process ends. As described above, the established communications link does not include SIP Internal Router 120. EP 130 communicates with call provider 114 using the EP external address.

Thus, as described above, the embodiments disclosed herein provide static mapping of EP 130 addresses, with the interface 110 and SIP Internal Router 130 each maintaining complete address translation information. So configured, the embodiments disclosed herein can be configured for fast SIP-aware communication with a large collection of EPs 130. Additionally, in one embodiment, static mapping also allows for the call providers 114 to be aware of exactly which IP address and/or port ranges they will be receiving messages from, increasing security on the far end.

Additionally, the disclosed embodiments provide SIP headers configured to convey the EP external address to an EP 130. So configured, the SIP reduces the node distance between the EP 130 and call provider 114, allowing a secure media connection for communication directly through interface 110.

As such, the embodiments disclosed herein offer advantages over previous systems and methods. For example, commonly used NATs can be configured for dynamic mapping of a small number of shared IP Endpoints, as described in U.S. Pat. No. 7,522,617, for example. Dynamic mapping, however, is not suitable for systems with a large number of internal Endpoints. In such systems, dynamic mapping is slow and cannot fully utilize all resources. The embodiments disclosed herein provide for static mapping and improved call setup in SIP systems for human/machine communication.

Some systems have attempted static mappings, hoping to achieve a faster alternative for a large IP port space. Simple IP routers can implement static mapping, but simple IP routers lack SIP awareness, which is essential for end-to-end media connection. Without SIP support, static mapping cannot meet the requirements for adequate human/machine communication. The embodiments disclosed herein provide for static mapping and improved call setup in SIP systems for human/machine communication.

U.S. Pat. No. 7,624,195 describes another approach: distributing the NAT functions to other network devices, such as an internal router. In such systems, the internal router requests an external IP address and port range from the NAT, and then uses the returned address information to translate message content. The internal router forwards the message to the NAT, where the NAT translates IP address information according to the same network translation information. This approach can be implemented using either a dynamic mapping or static mapping, but both types of mapping suffer from drawbacks.

For example, in typical static mapped systems using this approach, the NAT device keeps the entire address translation table, and translation information is only given to the internal router for each connection request. This connection set-up involves an extra step, where the internal router must request information from the NAT device, introducing delay in the time to connect, which degrades performance. In dynamic mapped systems, the problem is even worse, because the mappings change over time. But the embodiments disclosed herein provide for static mapping and improved call setup in SIP systems for human/machine communication.

Additionally, without SIP functionality, the process of connecting two devices in separate firewall-protected networks becomes more involved. For example, U.S. Pat. No. 7,522,594 describes a first network predicting the firewall that protects a second network by sending multiple messages to probe the mapping mechanism of a NAT. But the embodiments disclosed herein provide for static mapping and improved call setup in SIP systems for human/machine communication, which makes firewall prediction unnecessary as the SIP headers disclosed herein can be configured to contain external IP address information. As such, messages sent from interface 110, can be configured to include a reply-to address that opens a channel through which messages can route back to the original sender (i.e., EP 130).

Accordingly, the embodiments disclosed herein provide a complete mapping of internal resources by complete enumeration of ports/IPs in a static NAT collection, which, when coupled with address translation at the internal router level provides direct, high-quality, firewalled, SIP-enabled media routing. Further, complete one-to-one static assignment of the entire cloud of resources provides peak utilization. As such, the embodiments disclosed herein reduce setup lag and potential packet loss, improving human/machine communication reliability.

Other modifications and implementations will occur to those skilled in the art without departing from the spirit and scope of the invention as claimed. Accordingly, the above description is not intended to limit the invention except as indicated in the following claims.

What is claimed is:

1. A method for facilitating rapid establishment of a communications link between one of plurality of endpoints of a private network and a target call provider over an Internet Protocol (IP) network coupled therebetween, each of the plurality of endpoints configured to provide human-interactive media application services to the call provider over the established communications link, the method comprising:
   maintaining a static one-to-one map that represents a mapping for each of the plurality of endpoints, the mapping including at least an internal endpoint address mapped to an external endpoint address, the internal and external addresses being uniquely assigned to each of the plurality of endpoints; said maintaining further comprising:
   pre-distributing at least a portion of the map to at least one SIP router, the at least one SIP router coupled to at least a subset of the plurality of endpoints, the at least a portion of the map including the mappings for each of the at least a subset of the plurality of endpoints;
   generating an internal SIP call request on behalf of one of the plurality of endpoints, the internal SIP call request specifying link characteristics including the target call provider and an internal endpoint address assigned to one of the plurality of endpoints;
   translating the internal endpoint address of the internally generated SIP call request to an external endpoint address using the at least a portion of the map pre-distributed to the at least one SIP router to which the one of the plurality of endpoints is coupled;
   modifying the internally generated call request by at least replacing the specified internal endpoint address with the translated external endpoint address in the SIP header of the internally generated call request;
   sending the modified SIP call request over the IP network from the private network to the target call provider; and
   if the target provider accepts the modified call request, establishing the communications link by forwarding the translated external endpoint address to the one of the endpoints, the endpoint using the translated external address to communicate directly with the call provider over the IP network, while requiring no further intervention by the SIP router, until the call is terminated.

2. The method of claim 1 wherein:
   each of the plurality of endpoints is coupled to the IP network through at least one network interface; and
   the at least one network interface maintains at least a portion of the static one-to-one map that includes the mapping for at least each of the endpoints coupled thereto.

3. The method of claim 2 wherein each of the plurality of endpoints is coupled to the at least one network interface through a direct connection, and is further coupled to the at least one network interface through the at least one SIP router.

4. The method of claim 3 wherein the at least one SIP router performs said translating, said modifying and said sending.

5. The method of claim 3 wherein the one of the plurality of endpoints communicates directly with the call provider over the IP network through the direct connection to the at least one network interface.

6. The method of claim 1 wherein the internally generated SIP call request is initiated by a job initiation service.

7. The method of claim 1 wherein the mapping of an internal endpoint address to an external endpoint address includes port assignments for each of the plurality of endpoints.

8. A method for facilitating rapid establishment of a communications link between a call provider and one of plurality of endpoints of a private network over an Internet Protocol (IP) network coupled therebetween, each of the plurality of endpoints configured to provide human-interactive media application services to the call provider over the established communications link, the method comprising:
   maintaining a static one-to-one map that represents a mapping for each of the plurality of endpoints, the mapping including at least of an internal endpoint address mapped to an external endpoint address, the internal and external addresses being uniquely assigned to each of the plurality of endpoints; said maintaining further comprising:

pre-distributing at least a portion of the map to at least one SIP router, the at least one SIP router coupled to at least a subset of the plurality of endpoints, the at least a portion of the map including the mappings for each of the at least a subset of the plurality of the plurality of endpoints;

receiving a SIP call request over the IP network from the call provider to the private network, the SIP call request specifying link characteristics including an external endpoint address assigned to one of the plurality of endpoints;

translating the external endpoint address of the received SIP call request to an internal endpoint address using the at least a portion of the map pre-distributed to the at least one SIP router to which the one of the plurality of endpoints is coupled;

routing the SIP call request to the one of the plurality of endpoints assigned to the internal endpoint address; and if the assigned endpoint accepts the call request, establishing the communications link by forwarding the external endpoint address specified in the call request to the endpoint, the endpoint using the external address to communicate directly with the call provider over the IP network, while requiring no further intervention by the SIP router, until the call is terminated.

9. The method of claim 8 wherein:

each of the plurality of endpoints is coupled to the IP network through at least one network interface; and the at least one network interface maintains at least a portion of the static one-to-one map that includes the mapping for at least each of the endpoints coupled thereto.

10. The method of claim 9 wherein: each of the plurality of endpoints is coupled to the at least one network interface through a direct connection, and is further coupled to the at least one network interface through the at least one SIP router.

11. The method of claim 9 wherein said receiving is performed by the at least one network interface, said receiving further comprising:

translating the external endpoint address of the received SIP call request to an internal address using the static one-to-one map maintained by the network interface; and routing the SIP call request to the at least one SIP router based on the translated internal address.

12. The method of claim 8 wherein the at least one SIP router performs said translating, said routing and said forwarding.

13. The method of claim 10 wherein the one of the plurality of endpoints communicates directly with the call provider over the IP network through the direct connection to the at least one network interface.

14. The method of claim 7 wherein the static one-to-one mapping of an internal endpoint address to an external endpoint address includes port assignments for each of the plurality of endpoints.

15. A system for facilitating rapid establishment of a communications link between a call provider and one of plurality of endpoints of a private network over an Internet Protocol (IP) network coupled therebetween, each of the plurality of endpoints configured to provide human-interactive media application services to the call provider over the established communications link, the system comprising:

means for maintaining a static one-to-one map that represents a mapping for each of the plurality of endpoints, the mapping including at least an internal endpoint address mapped to an external endpoint address, the internal and external addresses being uniquely assigned to each of the plurality of endpoints; said means for maintaining further comprising:

means for pre-distributing at least a portion of the map to at least one SIP router, the at least one SIP router coupled to at least a subset of the plurality of endpoints, the at least a portion of the map including the mappings for each of the at least a subset of the plurality of endpoints;

means for receiving a SIP call request over the IP network from the call provider to the private network, the SIP call request specifying link characteristics including an external endpoint address assigned to one of the plurality of endpoints;

means for translating the external endpoint address of the received SIP call request to an internal endpoint address using the at least a portion of the map pre-distributed to the at least one SIP router to which the one of the plurality of endpoints is coupled;

means for routing the SIP call request to the one of the plurality of endpoints assigned to the internal endpoint address; and if the assigned endpoint accepts the call request, means for forwarding the external endpoint address specified in the call request to the endpoint to establish the communications link, the endpoint using the external address to communicate directly with the call provider over the IP network while requiring not further intervention by the SIP router, until the call is terminated.

16. The system of claim 15 wherein:

each of the plurality of endpoints is coupled to the IP network through at least one network interface; and the at least one network interface maintains at least a portion of the static one-to-one map that includes the mapping for at least each of the endpoints coupled thereto.

17. The system of claim 16 wherein said means for receiving further comprises:

means for translating the external endpoint address of the received SIP call request to an internal address using the static one-to-one map maintained by the at least one network interface; and means for routing the SIP call request to the at least one SIP router based on the translated internal address.

* * * * *